United States Patent [19]
Lisart et al.

[11] Patent Number: 5,384,749
[45] Date of Patent: Jan. 24, 1995

[54] CIRCUIT FOR THE MANAGEMENT OF MEMORY WORDS

[75] Inventors: Mathieu Lisart; Laurent Sourgen, both of Aix en Provence, France

[73] Assignee: SGS-Thomson Microelectronics S.A., Gentilly, France

[21] Appl. No.: 96,687

[22] Filed: Jul. 23, 1993

[30] Foreign Application Priority Data

Jul. 24, 1992 [FR] France .................. 92 09195

[51] Int. Cl.⁶ .................................. G11C 11/40
[52] U.S. Cl. .................... 365/230.01; 365/189.01; 365/189.07; 365/195
[58] Field of Search ............ 365/189.01, 189.07, 365/195, 230.01; 364/969, 969.01, 969.03, 969.02

[56] References Cited

U.S. PATENT DOCUMENTS

| | | |
|---|---|---|
| 3,264,615 | 8/1966 | Case et al. |
| 4,648,076 | 3/1987 | Schrenk .................. 365/230.01 |
| 4,744,062 | 5/1988 | Nakamura et al. .......... 365/228 |
| 4,931,993 | 6/1990 | Urushima ................ 365/189.01 |
| 5,119,336 | 6/1992 | Itoh ....................... 365/195 |
| 5,130,946 | 7/1992 | Watanabe ............... 365/189.01 |
| 5,226,006 | 7/1993 | Wang ..................... 365/189.01 |

FOREIGN PATENT DOCUMENTS

| | | |
|---|---|---|
| 0065148A2 | 11/1982 | European Pat. Off. |
| 3709205 | 9/1988 | Germany. |
| 8903081 | 4/1989 | WIPO. |

OTHER PUBLICATIONS

IBM Technical Disclosure Bulletin, vol. 16, No. 7, Dec. 1973, New York, US, pp. 2136–2137, Enger "Range Check of an Address Counter".

*Primary Examiner*—Eugene R. LaRoche
*Assistant Examiner*—Son Mai
*Attorney, Agent, or Firm*—Wolf, Greenfield & Sacks

[57] ABSTRACT

In a memory, a zone descriptor contains authorizations to act which may pertain to actions of reading, writing and erasure and which concerns memory words of a zone of the memory controlled by this descriptor. The zone descriptor also has an information element indicating the length of the memory zone by including the address of the next descriptor. An internal zone control signal is produced in order to store a mode of management of the memory zone and, an address corresponding to the end of the zone. The end of zone address is then compared with the addresses delivered by an address counter. A modification of the stored information is prompted when the end of a zone is reached.

20 Claims, 2 Drawing Sheets

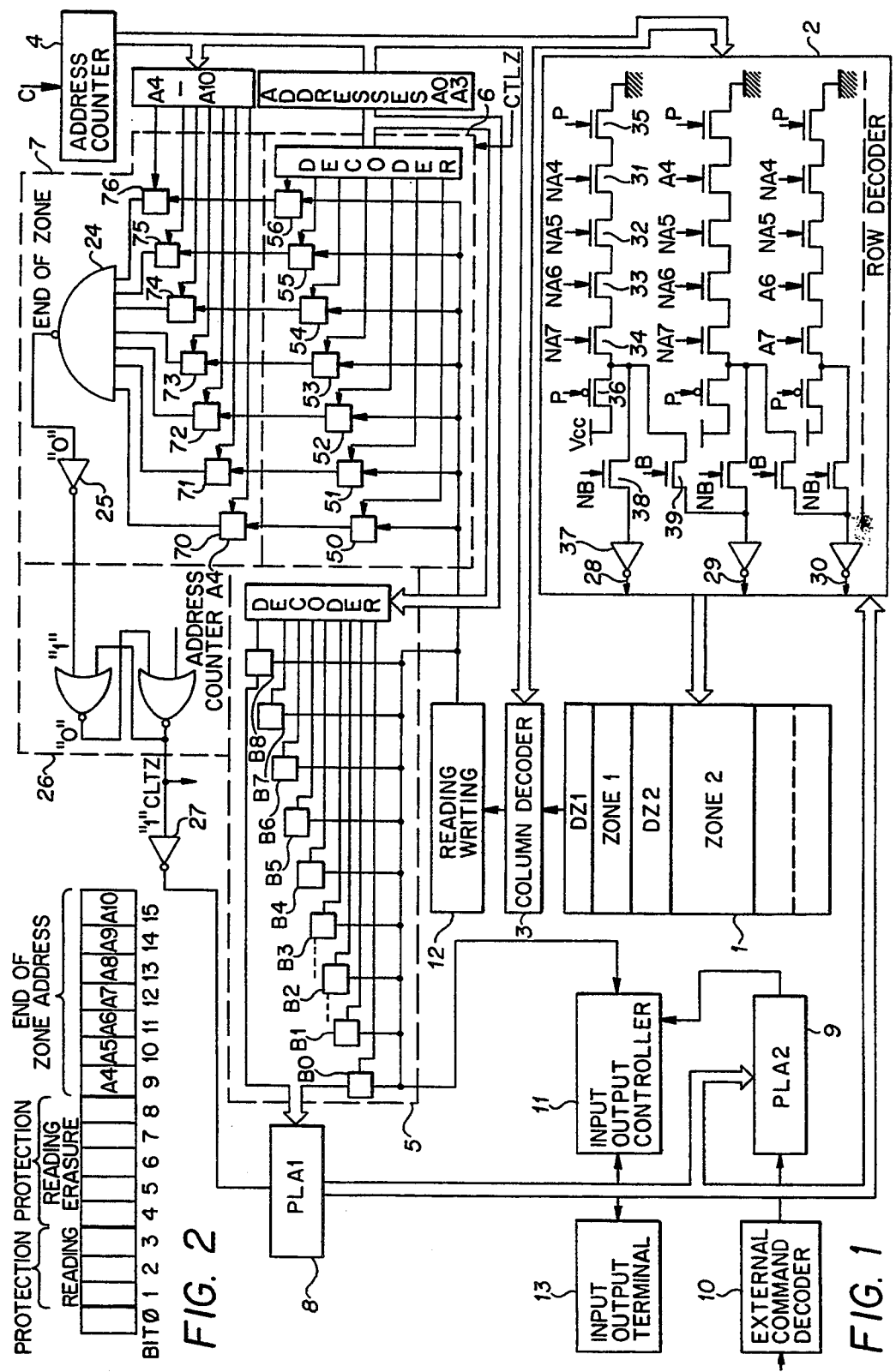

CIRCUIT FOR THE MANAGEMENT OF MEMORY WORDS

BACKGROUND OF THE INVENTION

1. Field of the Invention

The present invention relates to a circuit for controlling the reading, erasure, addressing and other management modes of memory words in a memory system. A mode of management is defined for each memory word by a special memory word called a descriptor. Each descriptor defines a management mode for a memory zone that includes a plurality of memory words. The invention can be used to manage memory systems including non-volatile memories such as electrically erasable and programmable memories (EEPROMs), and unerasable electrically programmable memories (EPROMs).

2. Discussion of the Related Art

There are known memory partitions, notably in chip card type applications, wherein non-volatile memory is distributed into zones in which only reading can be done, zones where reading and writing can be done, zones where only reading and erasing can be done, zones where not even reading can be done (notably when secret codes of the card are involved), and so on. Typically, the operating system of a chip card such as this, in electronic integrated circuits, comprises a microcontroller that permits only the authorized functions to be performed within each memory zone, as a function of a protection configuration defined by a descriptor corresponding to the memory zone.

An arrangement is known in which the memory zones that can be used in reading, writing or erasure are contiguous with one another and are arranged in one part of the memory, while the zone descriptors corresponding to these memory zones are arranged in another part of the memory. The reference to differing parts of the memory is both physical (the memory cells are arranged at different geographical locations on the memory map) and functional (the addresses of the different zones correspond to significant address bits equal to 0 for one part and to 1 for the other part).

A descriptor is a word of the memory that comprises a first group of bits that can be used to define the protection of the memory zone, and another group of bits marking the boundaries of the zone in the memory. These boundaries are constituted by start-of-zone and end-of-zone addresses. In the above-described system, a zone descriptor includes a single boundary address, i.e., the address of the end of the zone corresponding to this descriptor. The address of the start of the zone corresponding to a descriptor is the address, plus one unit, of the last memory word of the previous zone.

A system such as this works well but has a drawback in that, notably in applications with bank type chip cards, the addressing of the words of the memory is sequential. Thus, the access to a desired memory word cannot be obtained by using an address counter until the counter has inspected all the addresses of the words that precede the desired word, starting from the original address of the memory (00 . . . 00). To have access subsequently to another word of the memory, it is normally necessary, after having made the counter count up to the last address of the memory, to make it start counting again up to the address of this next desired word. It is also possible, in certain cases, to prompt a zero-setting of the counter before counting again up to the address of the next desired word. However, the mode of management or protection of the next desired word may be different from the mode of management of the previously accessed word. This complicates the concomitant handling, with this counter, of the modes of protection to be followed. It is possible, for example, to resolve the problem by limiting the excursion of the counter within a chosen counting window. However, this complicates the circuit and furthermore reduces the flexibility of use.

One object of the invention is to provide a simplified addressing device that can be used when it is sequential, even though the sequential character of this addressing with this counter is not completely indispensable. For illustrative purposes, an addressing scheme is described that is done word by word in the memory, each word being located in a different row of the memory. Within each word, addressing is done bit by bit. For a given word, a column decoder enables the connection, successively, of each of the bit lines of the word bit (the columns) to a single reading circuit, while a row decoder makes it possible, after the reading of a word, to go to the reading of the next word in a following row.

SUMMARY OF THE INVENTION

The foregoing problems are solved in one illustrative embodiment of the invention in which a circuit is provided for managing the reading, writing and erasure modes of the words of a memory zone in a memory system. The management circuit includes an address counter to generate address signals and a decision circuit to apply a mode of management to memory words of the memory. The management circuit further includes a first storage circuit to store a mode of management, a second storage circuit to store an address corresponding to the end of a memory zone, and a comparator to compare a current address generated by the address counter with the stored address corresponding to the end of a zone. The comparator generates a signal for loading a decision circuit when the current and stored addresses match. The decision circuit is loaded with the stored mode of management.

In another illustrative embodiment, a circuit is provided for managing the reading, writing and/or erasure modes of the memory words of a memory zone in a memory system with sequential addressing generated by an address counter. The memory system is partitioned into a plurality of zones, each memory word within a zone being assigned the same mode of management. The words within each zone have consecutive addresses and the zones are contiguous. At least one memory word is a zone descriptor that defines a mode of management of a memory zone with a first group of bits and, an address of an end of the memory zone with a second group of bits. The address of the zone descriptor DA of a memory zone A is the address of the first memory word in zone A. Zone descriptor DA has, as an information element, an address corresponding to the end of the memory zone A which identifies the descriptor DB of the following memory zone B. The management circuit includes a first storage circuit for storing a mode of management of the memory zone A and a second storage circuit for storing the address corresponding to the following descriptor DB. The management circuit further includes a comparator to compare a current address generated by the address counter with the address stored in the second storage circuit. The comparator generates a signal for loading a decision circuit when the stored and generated addresses match. The decision circuit is loaded with a mode of management corresponding to the first group of bits of the descriptor of the zone DA of this memory zone A.

BRIEF DESCRIPTION OF THE DRAWINGS

The invention will be understood more clearly from the following description and from the appended figures, which are given by way of an example and in no way restrict the scope of the invention. Of these figures:

FIG. 1 shows a management circuit according to the invention;

FIG. 2 illustrates the arrangement of bits in a zone descriptor;

DETAILED DESCRIPTION

Figure 3:
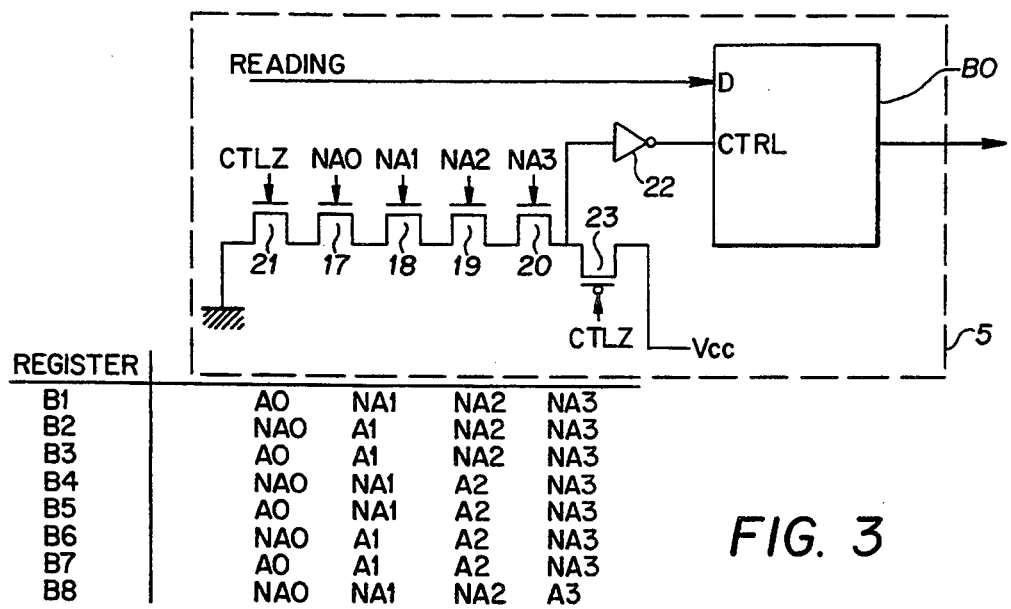
FIG. 3 shows the storage circuit used to store the mode of management of the words of the memory zone.

In the invention, to overcome the above-described problems of the prior art, a different procedure has been used. Firstly, the memory is organized so that a zone descriptor word that conditions a zone is placed in the memory with a physical address directly preceding the physical addresses of the words of the memory that correspond to this descriptor. The physical address of a word corresponds in practice to a row or word line. A physical address directly preceding another physical address is a word line adjacent to this address. There is thus physical adjacency in the memory map, apart from the modifications due to the redundancy. Adjacent the last memory word in each zone is the descriptor for the subsequent zone. In the descriptor of the invention, a first group of bits provides information on mode of management of the memory zone, and a second group of bits provides information on the address of the end of this memory zone. When the memory is read, the appearance of a zone descriptor is detected because, in addition to the address 00 . . . 00 which, in one embodiment of the invention, is obligatorily a zone descriptor, the address of the descriptor of the next zone is known. The descriptors are stored at addresses that directly follow the end of the preceding zones.

In the invention, when a zone descriptor appears (the first zone descriptor or the following ones), the first group of bits are stored to configure the use of the memory zone and, the second group of bits are stored to detect the end of the zone. The outputs of the address counter are then compared with the stored end-of-zone address. When the end-of-zone address is reached, the mode of management of the memory is replaced by the mode of management of the following descriptor and, the previous end-of-zone address is replaced by a following end-of-zone address. This system then has the advantage of being completely transparent when seen from the exterior since it does not require action by any microcontroller. A circuit of the invention automatically carries out this operation.

In one embodiment, the mode of management of the words within a memory zone is dictated by a first programmable logic circuit, receiving the mode of protection from a descriptor operated upon by another programmable logic circuit, the first programmable logic circuit also receiving commands from a source external to the memory. The advantage of the circuit of the invention lies in its simplicity in relation to the goal that is sought.

FIG. 1 shows one implementation of a circuit to manage the memory words of a memory 1 in accordance with the invention. The memory 1 is distributed into several zones, for example, the zones referenced ZONE1 and ZONE2. All the memory words of a zone are assigned the same protection mode or, more generally, the same management mode. The memory words of a zone occupy consecutive physical addresses. Access to the memory words of the memory is achieved through a row decoder 2. The consecutive or adjacent addresses are word lines. Thus, adjacent words can be addressed by incrementing the row address. The zones are contiguous. Thus, for example, the ZONE2 is adjacent to the ZONE1 in the memory 1. This means that the addresses of the end words of these zones are consecutive.

At least one memory word of each zone is used to store the descriptor of the zone. In the embodiment shown in FIG. 1, the first word in each zone stores the descriptor. The descriptor includes a first group of bits, for example, bits 1 to 8 shown in FIG. 2, that define a mode of management of the memory zone. The descriptor further includes a second group of bits, for example, bits 9 to 15 in FIG. 2, that define an address of an end of the memory zone concerned. In the above-described example, a memory word has 16 bits. To gain access to each of the bits of a word, a bit line decoder 3, also known as a column decoder, is used.

An address counter 4, in one example a counter with 11 outputs A0–A10, delivers address bits at its four least significant outputs A0–A3, enabling access to be obtained successively to each of the bits 0 to 15 of a memory word. These four least significant outputs are sourced to the input of the column decoder 3. The invention can also be used with other memory configurations having larger words to be managed, such as 32-bit words, or smaller words of 8 bits or less. The most significant bits of the address counter, i.e, bits A4 to A10, are used in the row decoder 2 to obtain access successively to each of the memory words of the memory.

In the invention, a first storage circuit 5 enables the storing of a mode of protection or management of the memory zone for which a descriptor is in the process of being read. A second storage circuit 6 enables the storing of the address of the end of the zone corresponding to this descriptor. The end-of-zone address corresponds to the address of the descriptor for the next zone. The second storing circuit 6 is connected to a comparator 7 which also receives the row address bits coming from the address counter 4. The output of this comparator 7 produces (irrespectively of the sign) an end-of-zone signal that prompts the loading, and then the holding, of the first group of descriptor bits in a programmable logic circuit 8-9.

The programmable logic circuit acts as a decision circuit and comprises, preferably, a first decision table 8 controlled by the first group of bits of the descriptor, and a second decision table 9. The second decision table 9 is controlled by the output of the first table 8 and, to filter them, receives external commands that are preferably filtered beforehand by a decoder of external commands 10. When a zone descriptor is read, the management mode bits of the zone descriptor are loaded into the first table 8, while the address of the end of the zone is loaded into the storing circuit 6.

A given word of the memory, addressed by prompting an adequate counting operation by the address counter 4 by means of a counting command C, may be subjected to commands filtered by the second table 9. These filtered commands are applied to this word by means of an input/output controller 11. The controller 11 is placed between a circuit 12 for the reading/writing/erasure of the memory, and input/output terminals 13 of the memory 1. The circuits 10 to 13 are of a known type and do not need any particular description. However, the making of a decision circuit with two tables 8 and 9 is specific to the invention in the sense that the latter is controlled by the former.

As can be seen in FIG. 1, the storage circuit 5 has 9 flip-flop circuits B0 to B8 to store the bits 0 to 8 of the descriptor. In the same example, the storage circuit 6 has seven flip-flop circuits 50–56 to store the address bits A4 to A10 of the end-of-zone address.

Figure 4:
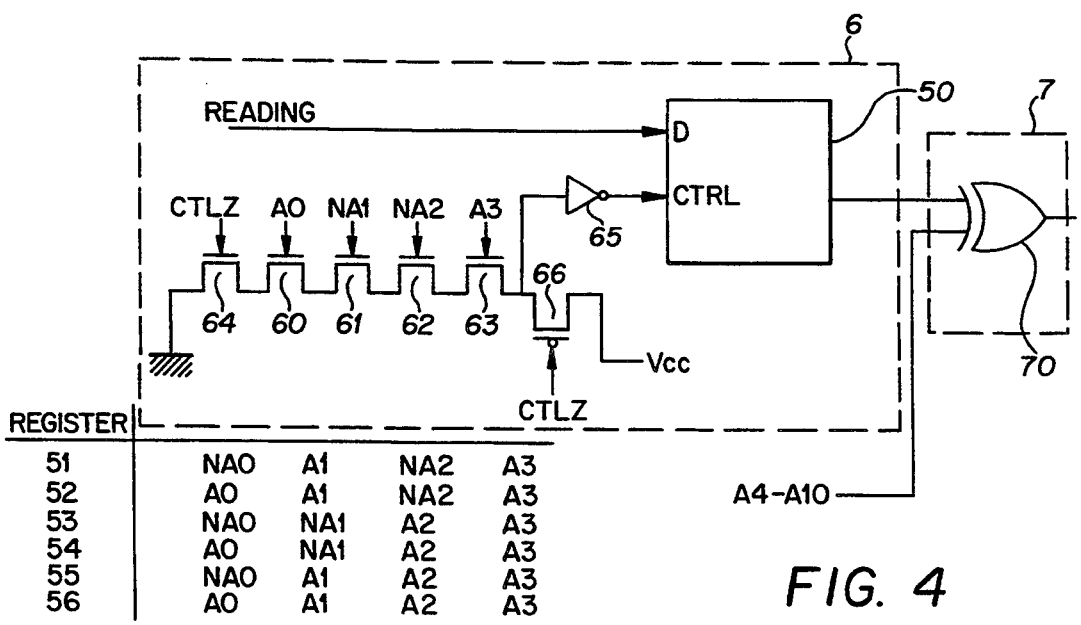
FIG. 4 shows the storage circuit for storing the address of the end of a memory zone and the comparator circuit used to produce an end-of-zone signal.

Using FIGS. 3 and 4, the functioning of the circuits 5 and 6 respectively shall now be described. The circuits 5 and 6 are of similar types and each of them has a set of buffer registers to each store the state of a bit. For example, FIGS. 3 and 4 show the buffer registers B0 and 50 respectively. At their data input, the registers B0 and 50 receive from the reading circuit 12 a bit of information read from the memory. Since this is a bit-by-bit reading operation, the electrical reading connection is common to all the inputs of the registers B0–B8 and 50–56 (see FIG. 1). The registers B0 and 50 are controlled by control signals applied to a control input CTRL. Each of the control signals is obtained by decoding the address bits A0, A1, A2 and A3 generated by the address counter 4. For example, for the storage of the bit 0 of the descriptor in the register B0, the address decoder is constituted by four series-connected N-type transistors 17 to 20. The transistors 17 to 20 respectively receive the signals NA0, NA1, NA2, NA3 which are respectively the inverse of address bits A0–A3. At the outset of the counting of the bits of a word, the four addresses A0 to A3 are zero (hence the signals NA0–NA3 are all equal to 1) and a signal CTLZ applied to a transistor 21 in series with the transistors 17 to 20, is equal to 1. The way in which the signal CTLZ is produced is described below. The transistor 21 is also connected to ground.

Under these conditions, at the start of the counting of the bits of one word, the input of an inverter 22 connected to this series of transistors 17 to 21 is taken to 0. The output of the inverter 22 is taken to 1. The control signal of the flip-flop circuit B0 is then equal to 1, and during the reading of the first bit of the first word of the memory, the flip-flop circuit B0 records the state of the bit 0 of the first descriptor, the descriptor DZ1. For the other registers B1–B8 of the storing circuit 5, FIG. 3 shows only the decoding states of the corresponding address bits A0 to A3 applicable to their decoding transactions. Thus, the second bit of the descriptor DZ1, the bit for which only A0 is equal to 1, is loaded into buffer register B1. The register B0 for its part does not, at this instant, record the new value of the bit read by the reading circuit 12 since the inverter 22, which is unstable, has an output that goes back to 0 as soon as its input is in a third state, owing to the fact that at least one of its transistors 17 to 21 goes off. Thus, in succession, each of the bits 0 to 8 of the descriptor is stored in the flip-flop circuits B0 to B8 of the circuit 5.

The address counter then continues to count and the second group of bits of the descriptor DZ1 are stored in the storing circuit 6. Loading of the register 50 shown in FIG. 4 is controlled by a series of transistors 60–64 and an inverter 65 that operate in much the same manner as the circuit 5 described above.

The second group of bits corresponds to the address of the end of the zone ZONE1. It can therefore be considered that, at the end of the reading of the descriptor, the buffer registers 50–56 contain the address of the next descriptor. Each of the outputs of the flip-flop circuits B0–B8 of the circuit 5 is sent to the first decision table 8, and each of the outputs of the flip-flops 50–56 is sent to a comparator 7. The comparator 7 is constituted essentially by a set of Exclusive-Or gates (XOR) 70–76, as shown in FIG. 4, the output of each of which is equal to "1" if the signals applied to its two inputs are different from one another, and the output of each of which is equal to "0" if the two inputs are not different from one another. The address of the end of the zone ZONE1 cannot be the address of the descriptor DZ1 itself. Consequently, the address bits A4 to A10 stored in the buffer registers 50–56 are, on the whole, different from 0. Consequently, at least one of the Exclusive-Or gates 70–76 delivers a "1" at output. The outputs of all the Exclusive-Or gates are connected together to a NAND gate 24, itself in series with an inverter 25. Once a zone descriptor has been read, the output of the inverter 25 is therefore taken to "0" until the reading of a following descriptor.

The Exclusive-Or gates 70–76 are seven in number here. Each of them respectively receives, in addition to the signal of the buffer registers to which they are connected, one of the address signals A4 to A10. The gates 70–76 in their totality compare the current address with the address stored in the buffer registers 50–56. The output of the inverter 25 is connected to a logic circuit 26 comprising two cascade-connected NOR gates. The other input of this logic circuit 26 receives the address transition signal of the address A4 (the least significant address of the addressing of the rows).

Figure 5:
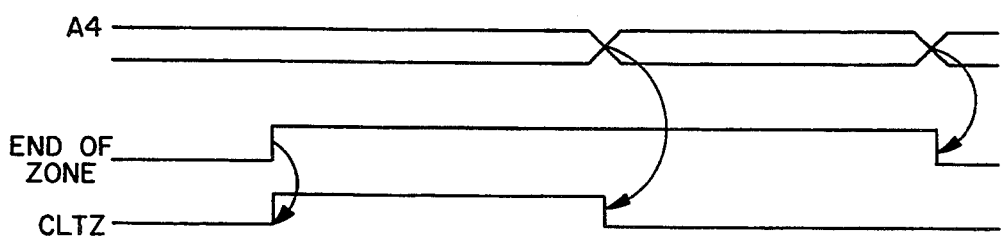
FIG. 5 is a timing diagram showing the production of a zone control signal CTLZ produced by the reading of a descriptor.

FIG. 5 shows, firstly, the action in time of the end-of-zone signal available at the output of the NAND gate 24 and, secondly, the action of the transition of the address signal A4. These two signals are combined by the circuit 26 to produce a pulse signal CTLZ. The signal CTLZ is the zone control signal and is applied, as described above, to transistors such as 21 and 64 of the storing circuits 5 and 6. Additionally, the signal CTLZ is also applied to P-type transistors such as 23 and 66 in the storing circuits 5 and 6. The transistors such as 23 and 66, other than when the signal CTLZ is equal to zero during the reading of a descriptor, respectively connect the inputs of the inverters such as 22 and 65 to the positive supply Vcc, thereby inhibiting loading of the buffer registers B0–B8 and 50–56.

The device works as follows. When the end of a memory zone is reached, the address counter delivers at its output address bits A4 to A10 corresponding to the next descriptor. Under these conditions, the XOR gates 70–76 all respectively receive the same thing at each of their two inputs. They therefore all deliver a "1" at their outputs, causing the NAND gate 24 and inverter 25 to generate a positive signal at the output of inverter 25. This positive signal is converted into a signal CTLZ going to "1" by the logic circuit 26.

The signal CTLZ going to "1" prompts the storing of the next descriptor, for example DZ2, in the storing circuits 5 and 6. As soon as the next zone descriptor is read in the memory, the comparison circuit 7 detects a discordance on at least one of the address bits. At least one of the XOR gates flips over, i.e., goes to "0". Consequently, the output of the logic circuit 26 also goes to "0". In any case, the detection of the changing of the address signal A4, at the end of this storing operation, blocks subsequent storing operations in the circuits 5 and 6. It furthermore prompts the transfer, into the programmable logic circuit 8, of the protection configuration stored in the circuit 5. This is obtained by means of an inverter 27. As soon as CTLZ falls to "0", NCTLZ (the complementary signal) rises again to "1", and the circuit 8 receives the data stored in the circuit 5.

A particular feature of the invention is that it also enables the so-called abacus mode of operation of the memory. An abacus is a structure in which balls are used to perform counting operations in a line, for example by being all shifted leftwards on this line. This means that when all the balls of a line have been shifted, then the first ball of a subsequent line is shifted, and also the balls of the previous line are returned to their original position. With memories, an operation in abacus mode consists of the programming, bit after bit, of each of the bits of a memory word and then of erasing all the bits of this memory word when a first bit of the following memory word is programmed. The abacus analogy is used herein in a broader context and includes a mode of operation wherein there is no question of erasing a word following the previous one, but when it is a matter of gaining access to this word as a function of an action performed on a preceding or following word respectively. In the invention, the notion of "following" may be replaced by a notion of "previous" in view of the sequential addressing, but the principle remains the same.

To allow for operation in the abacus mode, the row decoder 2 is modified with respect to its usual structure. A row decoder normally comprises, in order to gain access to each row such as 28 to 30 of the memory, a set of N-type transistors such as 31 to 34, series-connected between ground and the electrical supply. At their control gates, these transistors receive the row address signals or the inverse thereof, such as NA4 or A4, NA5 or A5 and so on until A10. These transistors are typically mounted between two transistors 35 and 36 receiving, at their gates, a signal P to enable the operation of the row decoder. The transistors 35 and 36 are of opposite types, the transistor 35 being an N-type transistor and the transistor 36 being a P-type transistor. The transistors 31 and 36 are connected between Vcc and ground. When the transistors 31 to 34 corresponding to an address receive this address signal, they go into a state of conduction and take the input of an inverter 37, connected to a selected line 28, to zero. Therefore, the output of this inverter goes to 1 so that the line 28 is selected, not the others.

In the invention, an addition has been made, between the series of transistors 31 to 34 and the input of each of the inverters such as 37, of an N-type transistor such as 38. This transistor 38 receives a signal NB which is in the active state when the entire memory zone concerned is not an abacus zone, i.e., when it is a normal memory zone. By contrast, when the zone concerned is an abacus zone, the signal NB is inactive. In this case, the transistor 38 uncouples the selection of the line 28. An N-type transistor 39, which itself receives the signal B which is a signal complementary to the signal NB, is connected between the series of the transistors 31 to 34 of a line 28 and the input of an inverter of a line 29 adjacent line 28. The addresses of these lines are consecutive. The preceding line 28 corresponds to the most significant value of the abacus. The transistor 39 enables the selection of the line 29 by addressing the line 28. A pair of transistors such as 38 and 39 is installed for each address line, firstly in series in the selection circuit of the word line (e.g., transistor 38), and secondly (e.g., transistor 39) between this selection circuit and the selection circuit of the following word line. The signals B and NB are delivered either directly by the storing circuit 5, or by an output of the first programmable logic table 8 through a decoding of bit 0 of the zone descriptor. This bit 0 is assigned to this function. When it is equal to "1", the zone is an abacus zone; if not it is a normal zone.

It is also possible to produce the signals B and NB as a function of an externally applied command. This can be done by providing an output from the decision circuit 9 to the decoder 2. As a result, without making the counter count, it is possible to obtain access to and act on either one of the memory lines 28 or 29.

The effect of this abacus operation is a shifting of the address, with a view to erasure or with another aim, for the selection of a row in the memory. This is used notably by an external abacus-type application, to erase a following full row at the very time when a previous row has been written in. The notion of a previous or following line can be reversed by connecting the transistor 39 to the inverter input of the previous line.

An abacus application is particularly valuable in an operation for the control of prepayment units for chip cards. In the invention, the fact of associating notions of an abacus code with the notion of the zone descriptor makes it possible, for example, by modifying the value of the zone descriptor, notably the end-of-zone address, to determine different quantities of prepayment units for a circuit that is physically the same. It also enables the revalidation of a chip card by the addition of an abacus zone.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A circuit for managing modes of operation, such as reading, writing and erasure modes, of memory words in a memory zone of an electrically programmable, non-volatile memory, the circuit comprising:
   an address counter that generates address signals;
   a row decoder, coupled to the address counter, that decodes the address signals and provides access to the memory words;
   a decision circuit that applies a mode of management to memory words of the memory;
   a first storage circuit to store a mode of management;
   a second storage circuit to store an address corresponding to the end of a memory zone; and
   a comparator to compare a current address generated by the address counter with the address stored in the second storage circuit, the comparator generating a signal to load the decision circuit with the mode of management stored in the first storage circuit.

2. A memory system that operates in modes of operation, such as reading, writing and erasure modes, the system comprising:
- an electrically programmable, non-volatile memory being partitioned into a plurality of contiguous zones, each zone including a plurality of memory words having consecutive addresses, each of the memory words of a zone being assigned a common mode of management, at least one memory word within each zone including a zone descriptor having a first group of bits defining a mode of management for the memory zone and a second group of bits defining an end address of the memory zone;
- an address counter that generates sequential address signals;
- a row decoder, coupled to the address counter, that decodes the address signals and provides access to the memory words;
- the address of the zone descriptor DA of a memory zone A being the first address of memory zone A;
- zone descriptor DA having, as an information element, an address corresponding to the end of the memory zone A, the end of memory zone A corresponding to the address of a zone descriptor DB of a following memory zone B;
- a first storage circuit to store a mode of management of the memory zone A;
- a second storage circuit to store the address corresponding to the zone descriptor DB;
- means for updating the first and second storage circuits after each of the words of the memory zone A have been addressed;
- a decision circuit that applies a mode of management to memory words of the memory; and
- a comparator to compare a current address generated by the address counter with the address stored in the second storing circuit, the comparator generating a signal loading the decision circuit with a mode of management corresponding to the first group of bits of the zone descriptor DA.

3. A circuit according to claim 1 wherein:
the first storage circuit comprises an address decoder, controlled by the loading signal, to replace the stored zone descriptor address with an address of the following zone descriptor.

4. A circuit according to claim 1 wherein:
the second storage circuit comprises an address decoder, controlled by the loading signal, to replace the stored mode of management of a memory zone A with a mode of management of following zone B.

5. A circuit according to claim 1 wherein:
the comparator has a set of Exclusive-OR gates connected to a logic circuit.

6. A circuit according to claim 1 wherein:
the decision circuit comprises a first decision table controlled by the first group of bits, and a second decision table, controlled by the first table and filtered external instructions, the first table being updated by the loading signal.

7. A circuit according to claim 1 further comprising:
a shifting circuit for shifting row addresses of the memory to enable an operation of this memory in abacus mode;
the shifting circuit comprising, on each row, a first gate for the selection of the row, and a second gate, in parallel with the first gate, for the selection of a contiguous row, the first and second gates respectively receiving signals from the decision circuit for deactivation and activation in abacus mode.

8. A memory system, comprising:
- a memory that is partitioned into a plurality of contiguous zones, each zone including a plurality of memory words having consecutive addresses, the memory further including a plurality of zone descriptors, each zone descriptor corresponding to a respective zone and including a first group of bits indicating an authorized mode of operation for the zone and a second group of bits indicating the end word address of the zone;
- a decision circuit that determines whether a mode of operation for an accessed memory word, such as reading, writing and erasing, is authorized;
- an address counter that generates consecutive memory address signals;
- a row decoder, coupled to the address counter, that decodes the address signals and provides access to the memory words;
- first and second storage circuits, responsive to the memory, to store each zone descriptor read from the memory, the first storage circuit storing the first group of zone descriptor bits indicating the mode of management for the memory zone corresponding to the zone descriptor, the second storage circuit storing the second group of zone descriptor bits indicating the end address of the corresponding memory zone;
- means for coupling the first storage circuit to the decision circuit so that when the decision circuit is loaded, it is updated with the mode of management stored in the first storage circuit; and
- a comparator to compare a current address generated by the address counter with the address stored in the second storage circuit and to assert an update signal that updates the decision circuit when the two addresses match, whereby the decision circuit is updated with the mode of management for the next memory zone when the end of a previous zone is detected.

9. A circuit as defined in claim 8 including means for loading the first and second storage circuits when the update signal is asserted.

10. A circuit as defined in claim 8 wherein the decision circuit includes:
- a first array of programmable logic responsive to the first group of zone descriptor bits stored in the first storage circuit; and
- a second array of programmable logic responsive to the first array and further responsive to instructions provided to the system from an external source.

11. A circuit as defined in claim 8 wherein the memory is an electrically programmable non-volatile memory.

12. A memory comprising:
- a plurality of contiguous zones, each zone including a plurality of memory words having consecutive addresses; and
- a plurality of zone descriptors, each zone descriptor corresponding to a respective zone and including a first group of bits indicating an authorized mode of operation for the zone and a second group of bits indicating the end word address of the zone, each zone descriptor being stored within the first word address of its corresponding memory zone.

13. A memory as defined in claim 12 wherein the memory is an electrically programmable non-volatile memory.

14. A method for managing a memory system, comprising the steps of:
- partitioning the memory into a plurality of contiguous zones, each zone including a plurality of memory words having consecutive addresses, each zone having first and second boundary word addresses;
- generating a plurality of zone descriptors, each zone descriptor corresponding to a respective zone and including a first group of bits indicating an authorized mode of use for the memory words within the zone and a second group of bits indicating the first boundary word address of an adjacent zone;
- storing each zone descriptor within the first boundary word address of its corresponding memory zone;
- generating a memory address for accessing the memory;
- specifying a mode of use for the accessed memory address;
- accessing the memory with the memory address and the specified mode of use;
- determining whether the memory address is equal to the first boundary word address of a memory zone adjacent the zone being addressed and when it is, updating a management table with the first group of bits of the zone descriptor stored at the memory address; and
- checking the management table to determine whether the specified mode of use for the addressed memory word is authorized and if it is not, prohibiting access to the addressed memory word.

15. A method as defined in claim 14 including the step of storing the second group of bits of a zone descriptor in a temporary storage circuit when it is determined that the memory address is equal to the first boundary word address of a memory zone adjacent the zone being addressed; and wherein the step of determining whether the memory address is equal to the first boundary word address of a memory zone adjacent the zone being addressed includes the step of comparing the memory address with the second group of zone descriptor bits stored in the temporary storage circuit.

16. A method as defined in claim 14 wherein the memory is an electrically programmable non-volatile memory.

17. A circuit for permitting operation of a memory system in abacus mode in response to activation of an abacus mode signal, the memory system including a memory having a plurality of rows, each row having a corresponding row access line that enables access to the row when asserted, each row access line being responsive to a series of row transistors that are responsive to memory address signals and assert the row access line when the row is selected by the memory address signals, the circuit comprising:
- a plurality of series transistors corresponding respectively to the plurality of row access lines, each series transistor being disposed in series between the row access line and its corresponding series of row transistors, each series transistor being responsive to the deassertion of the abacus mode signal to enable its corresponding series of row transistors to drive the row access line; and
- at least one parallel transistor disposed in parallel between the row access line of a first row and the series of row transistors of an adjacent row, the at least one parallel transistor being responsive to the assertion of the abacus mode signal to enable the row access line of the first row to be driven by the series of row transistors of the adjacent row.

18. A circuit as defined in claim 17 wherein the memory is an electrically programmable non-volatile memory.

19. A circuit as defined in claim 17 wherein a parallel transistor is disposed in parallel between every pair of adjacent rows except the first and second rows.

20. A circuit as defined in claim 17 wherein a parallel transistor is disposed in parallel between every pair of adjacent rows except the last and second to last rows.

* * * * *